Patented Sept. 24, 1940

2,216,001

UNITED STATES PATENT OFFICE 2,216,001

PROCESS FOR THE PRODUCTION OF HYDRINDENE AND ALPHA- AND BETA-TRUXENE

Ewald Dietzel, Castrop-Rauxel, Westphalia, Germany, assignor to Rütgerswerke-Aktiengesellschaft, Berlin, Germany No Drawing. Application June 13, 1936, Serial No. 85,126. In Germany July 20, 1935

4 Claims. (Cl. 260—668)

It is known that on thermal decomposition of indene resin, among other products, hydrindene, truxene, chiefly however, indene will form. On thermal decomposition under reduced or under normal atmospheric pressure or under slight excess pressure the distillate of the raw material contains considerable quantities of high-boiling substances which are apparently incompletely decomposed. When proceeding under high pressure comparatively few high-boiling substances are formed, the residue in this case, however, containing a considerable amount of coke. According to the known processes the yields of valuable hydrocarbons are too low for the technical production of hydrindene and truxene.

It has now been found that the yields and consequently also the economy of the process can be essentially improved by heating indene or indene-resin respectively to the conversion temperature of the raw material into hydrindene and truxene or to even higher temperatures and by submitting the resulting or the non-converted indene again to the conversion process. By conversion temperature I mean the temperature at which the conversion of the initial material into hydrindene and truxene takes place through thermal decomposition.

For this purpose the vaporous decomposition products formed on heating the raw material may be conducted through a fractionating column. The higher boiling indene will then condense and will be reconducted into the decomposition vessel. In addition, the reconducted liquid prevents noxious overheating of the reaction mixture and the formation of coke. The distillate is a fairly pure hydrindene and may be further purified by refining agents such as concentrated sulphuric acid, $AlCl_3$ or maleic acid anhydride, etc., or the like or by means of fractional distillation.

The above described conversion of indene resin or of indene may also be carried out continuously and may also be accelerated through the addition of suitable catalysts, such as magnesium chloride, manganese chloride, calcium chloride, cuprous chloride or other metal chlorides, reducing the conversion temperature. For this purpose the preheated and liquified indene resin is conducted into a heated apparatus and is heated to a temperature passing the decomposition or the conversion temperature so as to cause the indene resin or the indene to convert with sufficient rapidity without formation of coke. The reaction products, viz. hydrindene and partly non-converted indene, escaping in the form of vapor, are conducted into a fractionating column. The lower boiling hydrindene distills over in great purity and the indene-containing column reflux is reintroduced into the decomposition apparatus. The reaction product leaving said apparatus in a liquid state contains almost exclusively truxene.

The residue obtained in the continuous or in the discontinuous process, according to my invention, is free from coke and represents a crude truxene that may be separated into alpha- and beta-truxene. The readily soluble beta-truxene, for instance, can be removed by means of extraction with a suitable solvent, such as benzol or xylol. The residue consists of a high-percent alpha-truxene which eventually may be further purified by recrystallisation. The extract contains beta-truxene and also partly non-converted raw-material. By means of evaporating and cooling the extract beta-truxene is obtained. The mother liquors concentrated by evaporation are either again treated according to this process or the resinous constituents are removed by destructive distillation, the residue yielding truxene.

Example 1

40 kilos of indene resin having a softening point of 115° C. are heated in a distilling still. Decomposition of the resin takes place at about 300° C. and increases as the temperature rises. The decomposition products are distilled through the fractionating column on the still. The distillate is purified with concentrated sulphuric acid, washed with soda solution and distilled again.

The yield of pure hydrindene amounts to 16.6 kilos. The residue remaining in the still is extracted with benzole; on cooling and recrystallising the extract an amount of 1.92 kilos of pure beta-truxene is obtained. The extraction residue is rechystallized in high boiling solvent benzole, thus yielding 3.2 kilos of pure alpha-truxene.

Example 2

50 kilos of indene resin having a softening point of 115° C. are well mixed with 2% of calcium chloride and treated in a distillation still, as described in Example 1. The resin begins to decompose at about 270° C. The distillate is treated with sulphuric acid, washed with soda solution and then distilled.

The yield of pure hydrindene amounts to 37%. On extracting the residue in the still, 3.1% of beta-truxene is obtained and from the residue 6.5% of alpha-truxene.

The present process can be carried out in a continuous manner, with or without addition of hydrogen, similar to the cracking of hydrocarbons. In the same way as when cracking crude oil according to the process of Dubbs, the preheated and liquified raw material is conducted into a reaction chamber through a system of tubes which have been heated to a suitable temperature. The products leaving the reaction chamber are separated from one another by distillation. During the distillation process indene and hydrindene will escape, truxene remaining in the residue. The hydrindene boiling at 177° C. is separated by fractionating in a column from the indene which boils at 181–182° C. The non-converted indene is reintroduced into the reaction chamber.

What I claim is:

1. A process for the production of hydrindene and truxene, comprising the steps of introducing indene into a decomposition vessel, adding to said indene a metal chloride adapted to act as a catalyst, heating the mixture of indene and a metal chloride in said decomposition vessel at conversion temperature to convert the indene into vaporous decomposition products and liquid truxene, leading the vaporous decomposition products containing hydrindene and non-converted indene into a fractionating column to distill same therethrough, distilling over said hydrindene through said fractionating column, and reintroducing the reflux containing non-converted indene from said fractionating column into said decomposition vessel and reheating it in the latter at conversion temperature.

2. A process for the production of hydrindene and truxene, comprising the steps of introducing indene resin into a decomposition vessel, adding to said indene resin a metal chloride adapted to act as a catalyst, heating the mixture of indene resin and a metal chloride in said decomposition vessel at a conversion temperature to convert the indene resin into vaporous decomposition products and liquid truxene, leading the vaporous decomposition products containing hydrindene and non-converted indene into a fractionating column to distill same therethrough, distilling over said hydrindene through said fractionating column, and reintroducing the reflux containing non-converted indene from said fractionating column into said decomposition vessel and reheating it in the latter at conversion temperature.

3. A process for the production of hydrindene and truxene, comprising the steps of introducing indene into a decomposition vessel, adding to said indene a metal chloride adapted to act as a catalyst, heating the mixture of indene and a metal chloride in said decomposition vessel at a conversion temperature to convert the indene into vaporous decomposition products and liquid truxene, leading the vaporous decomposition products containing hydrindene and non-converted indene into a fractionating column, distilling over said hydrindene through said fractionating column, reintroducing the reflux containing non-converted indene from said fractionating column into said decomposition vessel and reheating it in the latter at conversion temperature, and separating the truxene obtained by a solven into $\alpha$- and $\beta$-truxene.

4. A process for the production of hydrindene and truxene, comprising the steps of introducing indene resin into a decomposition vessel, adding to said indent resin a metal chloride adapted to act as a catalyst, heating the mixture of indene resin and a metal chloride in said decomposition vessel at a conversion temperature to convert the indene resin into vaporous decomposition products and liquid truxene, leading the vaporous decomposition products containing hydrindene and non-converted indene into a fractionating column, distilling over said hydrindene through said fractionating column, reintroducing the reflux containing non-converted indene from said fractionating column into said decomposition vessel and reheating it in the latter at conversion temperature, and separating the truxene obtained by a solvent into $\alpha$- and $\beta$-truxene.

EWALD DIETZEL.